US011864286B2

(12) United States Patent
Archer et al.

(10) Patent No.: US 11,864,286 B2
(45) Date of Patent: Jan. 2, 2024

(54) CONTROLLING LED CHANNEL CURRENT VIA HYBRID DC AND PWM REFERENCE SIGNAL

(71) Applicant: ERP POWER, LLC, Moorpark, CA (US)

(72) Inventors: Michael Archer, Moorpark, CA (US); Steven C. Krattiger, Northridge, CA (US); Louis Chen, Simi Valley, CA (US); James H. Mohan, Valencia, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

(21) Appl. No.: 18/052,072

(22) Filed: Nov. 2, 2022

(65) Prior Publication Data

US 2023/0292418 A1 Sep. 14, 2023

Related U.S. Application Data

(60) Provisional application No. 63/275,382, filed on Nov. 3, 2021.

(51) Int. Cl.
*H05B 45/325* (2020.01)
*H05B 45/375* (2020.01)
*H05B 45/14* (2020.01)

(52) U.S. Cl.
CPC .......... *H05B 45/325* (2020.01); *H05B 45/14* (2020.01); *H05B 45/375* (2020.01)

(58) Field of Classification Search
CPC ...... H05B 45/30; H05B 45/46; H05B 45/325; H05B 45/14; H05B 45/375; H05B 45/10
See application file for complete search history.

(56) References Cited

U.S. PATENT DOCUMENTS

2014/0152187 A1* 6/2014 Lin .................... H05B 45/3725 315/200 R

FOREIGN PATENT DOCUMENTS

| | | | | |
|---|---|---|---|---|
| CN | 1829303 A | * | 9/2006 | H04N 9/3105 |
| CN | 103889133 A | * | 6/2014 | |
| DE | 102014226582 A1 | * | 6/2016 | H05B 33/0845 |
| JP | 2006267995 A | * | 10/2006 | H04N 9/3105 |
| JP | 2011103285 A | * | 5/2011 | H05B 33/0809 |

* cited by examiner

*Primary Examiner* — Abdullah A Riyami
*Assistant Examiner* — Syed M Kaiser
(74) *Attorney, Agent, or Firm* — Lewis Roca Rothgerber Christie LLP

(57) ABSTRACT

A multi-channel power supply system includes a power supply circuit configured to generate a drive signal for powering a plurality of color channels based on an input power signal, a channel controller configured to generate a first pulse width modulated (PWM) signal for controlling an output light intensity of a first color channel of the plurality of color channels, a filter circuit configured to generate a first pseudo-sawtooth signal based on the first PWM signal, and a first current control circuit coupled to a first color channel of the plurality of color channels and configured to adjust a first channel current of the first color channel based on the drive signal and the first pseudo-sawtooth signal.

19 Claims, 4 Drawing Sheets

CONTROLLING LED CHANNEL CURRENT VIA HYBRID DC AND PWM REFERENCE SIGNAL

CROSS-REFERENCE TO RELATED APPLICATION(S)

This application claims priority to, and the benefit of, U.S. Provisional Application No. 63/275,382 ("CONTROLLING LED CHANNEL CURRENT VIA HYBRID DC AND PWM REFERENCE SIGNAL"), filed on Nov. 3, 2021, the entire content of which is incorporated herein by reference.

FIELD

Aspects of the present invention are related to light drivers.

BACKGROUND

A light emitting diode (LED) is an electronic device that converts electrical energy (commonly in the form of electrical current) into light. The light intensity of an LED is primarily based on the magnitude of the driving current. An LED light source may simulate warm colors by optically mixing light from white LEDs with other color LEDs, such as amber LEDs, and controlling their drive currents to in a manner such that the light combination changes from a white color light to a more yellowish/orangish white light. In the related art, such LED light sources, which mix light from colored LEDs use separate drivers for controlling the different LEDs individually. However, such solutions present additional costs and involve complex control schemes. Further, in the related art, the driver(s), have a cut off voltage that are incapable of correctly producing low dimming levels. Thus, LED dimming methods of the related art often do not result in a linear control of the LED light output and/or induce undesirable ripples in the output of the converter, which can be noticeable to a user.

The above information disclosed in this Background section is only for enhancement of understanding of the invention, and therefore it may contain information that does not form the prior art that is already known to a person of ordinary skill in the art.

SUMMARY

Aspects of some embodiments of the present disclosure are directed to a light driver including channel regulators for driving independent color channels that is controlled by a pseudo sawtooth signal that operates as a DC voltage when above the regulator's cutoff voltage and as a PWM signals when below this threshold. In some embodiments, the pseudo-sawtooth waveform supplied to the regulator is capable of adjusting the current of a color channel down to very low dimming levels without adversely affecting the current ripple of the color channel. The pseudo-sawtooth waveform is derived from a PWM square waveform that is generated by the driver channel controller and filtered using analog components. In some embodiments, the LED driver can maintain DC regulation above a certain dimming threshold and switch to PWM regulation when operating under the dimming threshold.

According to some embodiments, there is provided a multi-channel power supply system including: a power supply circuit configured to generate a drive signal for powering a plurality of color channels based on an input power signal; a channel controller configured to generate a first pulse width modulated (PWM) signal for controlling an output light intensity of a first color channel of the plurality of color channels; a filter circuit configured to generate a first pseudo-sawtooth signal based on the first PWM signal; and a first current control circuit coupled to a first color channel of the plurality of color channels and configured to adjust a first channel current of the first color channel based on the drive signal and the first pseudo-sawtooth signal.

In some embodiments, the first color channel includes one or more light emitting diodes (LEDs) having a red color, a blue color, or a green color, the one or more LEDs being configured to output a light intensity corresponding to the first channel current.

In some embodiments, the first current control circuit includes: a regulator coupled to the first color channel, and configured to receive the drive signal, the first pseudo-sawtooth signal, and the first channel current, and to regulate the first channel current based on the first pseudo-sawtooth signal.

In some embodiments, the regulator is configured to turn off and to shutoff the first channel current in response to a voltage of the first pseudo-sawtooth signal dropping below a cutoff voltage, wherein, in response to the first pseudo-sawtooth signal falling below the cutoff voltage, the regulator is further configured to continuously adjust the first channel current according to an effective duty cycle of the first pseudo-sawtooth signal, and wherein the effective duty cycle of the first pseudo-sawtooth signal corresponds to a dimming level set by a dimming controller.

In some embodiments, in response to the first pseudo-sawtooth signal being above a cutoff voltage, the regulator is further configured to continuously adjust the first channel current according to an effective DC value of the first pseudo-sawtooth signal, and the effective DC value of the first pseudo-sawtooth signal corresponds to a dimming level set by a dimming controller.

In some embodiments, the first current control circuit further includes: a sense resistor electrically coupled in series with the first color channel and in a current path of the first channel current, wherein the regulator is configured to sense the first channel current by measuring a voltage drop across the sense resistor.

In some embodiments, the first current control circuit further includes: an inductor coupled between the first color channel and the regulator and positioned in a current path of the first channel current to enable the regulator to regulate the first channel current.

In some embodiments, the filter circuit includes: a first low pass filter coupled between the channel controller and the first current control circuit and configured to low pass filter the first PWM signal to generate the first pseudo-sawtooth signal that is a smoothly varying analog signal.

In some embodiments, the channel controller is configured to generate the first PWM signal based on a dimmer setting from a dimming controller.

In some embodiments, the multi-channel power supply system further includes: an output rectifier coupled to a secondary winding of the power supply circuit and configured to prevent a reverse current at the first color channel; and a capacitor coupled to the output rectifier and configured to filter the drive signal.

In some embodiments, the channel controller, the filter circuit, and the first current control circuit are coupled to a secondary side of the power supply circuit.

In some embodiments, the channel controller is further configured to generate a second PWM signal for controlling an output light intensity of a second color channel of the plurality of color channels, and to generate a third PWM signal for controlling an output light intensity of a third color channel of the plurality of color channels.

In some embodiments, the filter circuit further includes: a second low pass filter configured to generate a second pseudo-sawtooth signal based on the second PWM signal; and a third low pass filter configured to generate a third pseudo-sawtooth signal based on the third PWM signal.

In some embodiments, the multi-channel power supply system further includes: a second current control circuit coupled to a second color channel of the plurality of color channels and configured to adjust a second channel current of the second color channel based on the drive signal and a second pseudo-sawtooth signal; and a third current control circuit coupled to a third color channel of the plurality of color channels and configured to adjust a third channel current of the third color channel based on the drive signal and a third pseudo-sawtooth signal.

In some embodiments, the first color channel includes one or more green light emitting diodes (LEDs), the second color channel includes one or more blue LEDs, and the third color channel includes one or more red LEDs.

In some embodiments, the power supply circuit includes: a voltage converter; and a transformer having a primary winding coupled to the voltage converter and a secondary winding electrically isolated from the primary winding and coupled to the first current control circuit.

In some embodiments, the multi-channel power supply system further includes: an input rectifier circuit configured to rectify the input power signal to generate a rectified signal having a single polarity, wherein the power supply circuit is configured to generate the drive signal based on the rectified signal.

In some embodiments, the input rectifier circuit includes a bridge rectifier, and the input power signal is an alternating-current (AC) signal.

According to some embodiments, there is provided a multi-channel power supply system including: a power supply circuit configured to generate a drive signal for powering a plurality of color channels based on an input power signal, the plurality of color channels including a red color channel, a green color channel, and a blue color channel; a channel controller configured to generate a first pulse width modulated (PWM) signal for controlling an output light intensity of the green color channel, a second PWM signal for controlling an output light intensity of the blue color channel, and a third PWM signal for controlling an output light intensity of the red color channel; a filter circuit configured to generate a first pseudo-sawtooth signal based on the first PWM signal, a second pseudo-sawtooth signal based on the second PWM signal, and a third pseudo-sawtooth signal based on the third PWM signal; a first current control circuit coupled to the green color channel and configured to adjust a first channel current of the green color channel based on the drive signal and the first pseudo-sawtooth signal; a second current control circuit coupled to the blue color channel and configured to adjust a second channel current of the blue color channel based on the drive signal and the second pseudo-sawtooth signal; and a third current control circuit coupled to the red color channel and configured to adjust a third channel current of the red color channel based on the drive signal and the third pseudo-sawtooth signal.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a compact, integrated multi-layered lighting system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to a multi-channel light driver that utilizes a pseudo-sawtooth waveform to adjust the output current of each color channel according to a dimmer setting. The light driver includes a regulator at each color channel to control the current output of the channel. The regulator has a cut off voltage that may correspond to about 5% output (e.g., dimming level at 5%). When the control signal to the regulator falls below this cutoff, the regulator turns off, thus shutting down current to the LED lights. According to some embodiments, the light driver generates a pseudo-sawtooth waveform based on a square PWM signal generated by a channel controller and uses the pseudo-sawtooth waveform as the control signal to the regulator. Using this scheme, the regulator operates in DC regulation mode and produces a stable channel current that corresponds to effective DC value of the pseudo-sawtooth signal, when the voltage of the pseudo-sawtooth signal is higher than the cutoff voltage. When the voltage of the pseudo-sawtooth signal falls below the cutoff voltage, the regulator operates in PWM mode, and the channel current is determined based on the duty cycle of pseudo-sawtooth signal.

Figure 1:
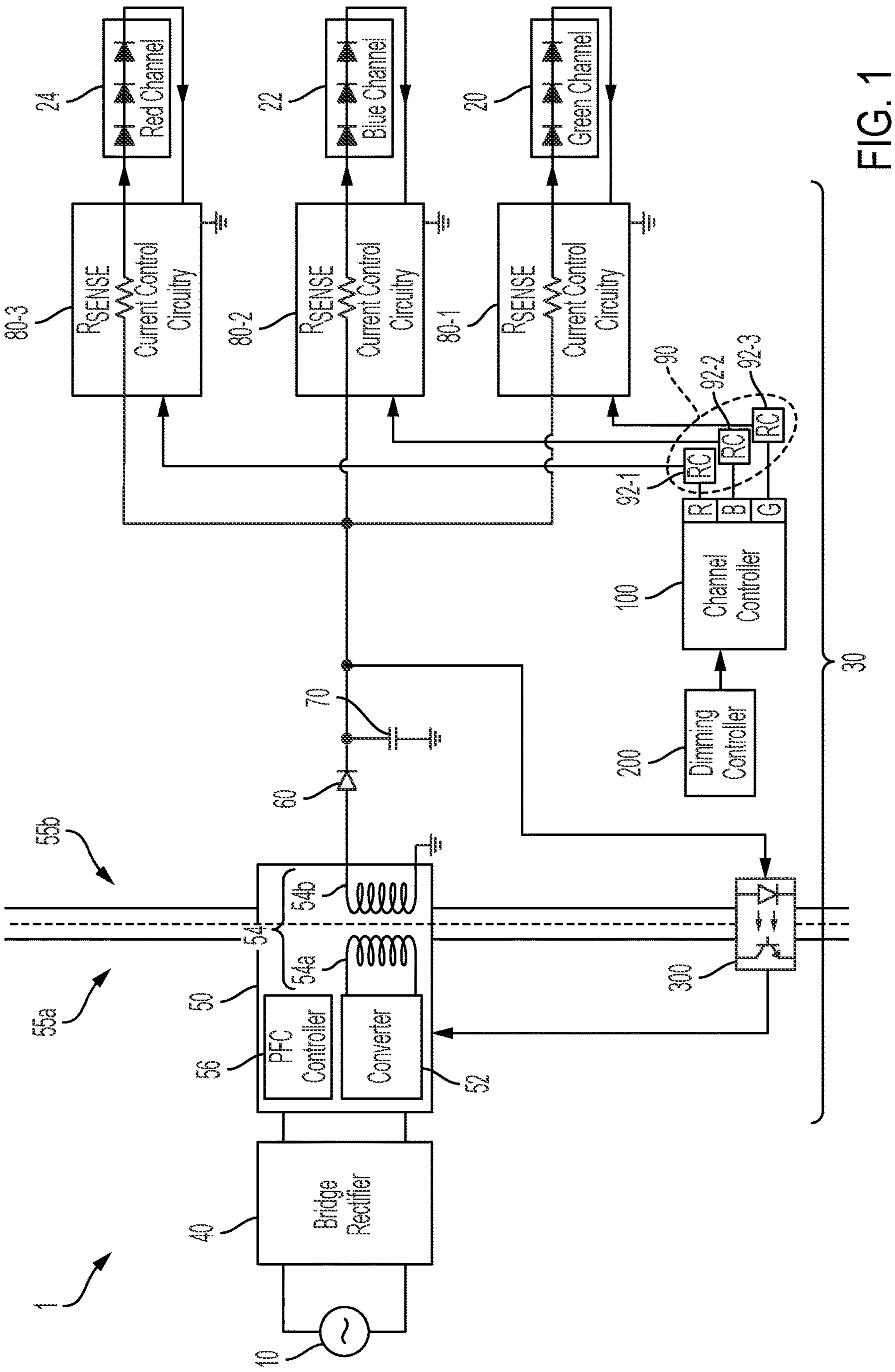
FIG. 1 illustrates a lighting system including a multi-channel light driver, according to some example embodiments of the present disclosure.

FIG. 1 illustrates a lighting system 1 including a multi-channel light driver 30, according to some example embodiments of the present disclosure.

According to some embodiments, the lighting system 1 includes an input source 10, a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, or 277 Vac, for example. The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes an input rectifier (e.g., an input rectifier circuit) 40, a power supply circuit 50, an output rectifier 60, a filter 70, a plurality of current control circuits 80-1 to 80-3, and a channel controller 100.

The input rectifier 40 may provide a same polarity of output for either polarity of the AC signal from the input source 10. In some examples, the input rectifier 40 may be a full-wave circuit using a center-tapped transformer, a full-wave bridge circuit with four diodes, a half-wave bridge circuit, or a multi-phase rectifier.

The power supply circuit 50 converts the rectified AC signal generated by the input rectifier 40 into a drive signal for powering the plurality of color channels 20, 22, and 24. In some embodiments, the power supply circuit 50 includes a voltage converter 52 for maintaining (or attempting to maintain) a constant DC bus voltage on its output while drawing a current that is in phase with and at the same frequency as the line voltage (by virtue of a PFC controller/circuit 56). A transformer 54 inside the power supply circuit 50 produces the desired output voltage from the DC bus. In some examples, the power supply circuit 50 may include the PFC circuit (or PFC controller) 56 for improving (e.g., increasing) the power factor of the load on the input source 10 and reducing the total harmonic distortions (THD) of the light driver 30. The power supply circuit 50 has a primary side 55*a* and a secondary side 55*b* that is electrically isolated from, and inductively coupled to, the primary side 55*a*. The primary and secondary sides 55*a* and 55*b* may correspond to the primary and secondary windings 54*a* and 54*b* of the transformer 54.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, the color channels 20, 22, and 24 share a common output rectifier (e.g., diode) 60 and filter (e.g., capacitor) 70, which convert the AC driving signal output by the secondary winding 54*a* of the transformer 54 into a DC channel current for driving the color channels 20, 22, and 24. The anode of the output rectifier 60 may be connected (e.g., directly connected) to the output terminal of the power supply circuit 50.

According to some embodiments, each of the plurality of current control circuits to 80-3 is configured to adjust the channel current of the corresponding color channel based on the drive signal from the power supply circuit 50 and a corresponding filtered reference signal (e.g., a pulse width modulated (PWM) signal) from the channel controller 100 and the filter circuit 90. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve. The channel controller 100 determines the color mix (e.g., the intensity of the red, blue, and green light colors) for each color temperature based on a lookup table that provides the light intensities of the different color channels. The tabulated color mix may accurately follow the black body curve.

The dimmer level may be determined based on a dimmer setting from a dimming controller 200, which may be in electrical communication with the channel controller 100, as shown in FIG. 1. However, embodiments of the present disclosure are not limited thereto. For example, the dimming controller 200 may also be a TRIAC or ELV dimmer at the input source 10.

Figure 2:
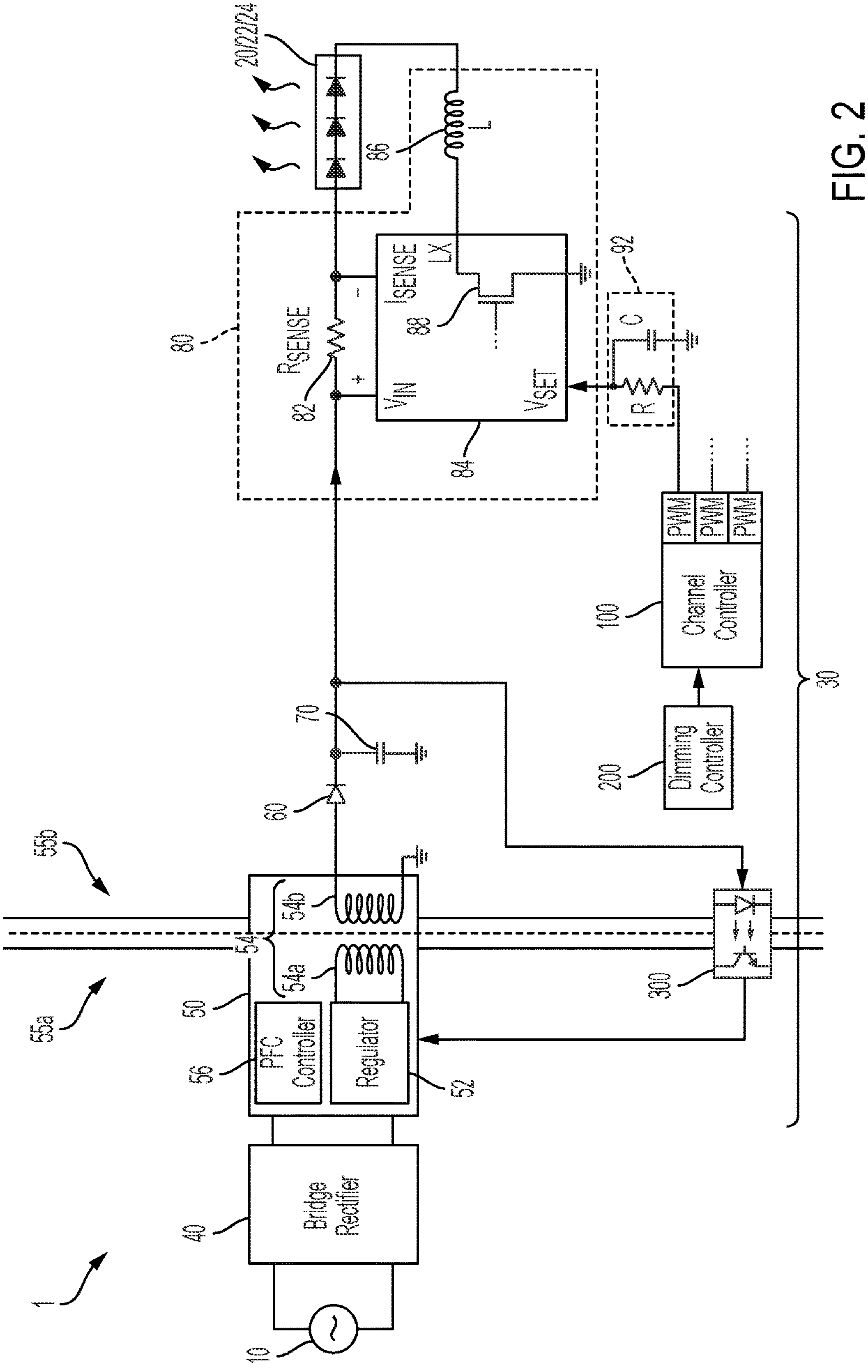
FIG. 2 illustrates a schematic diagram of a current control circuit of the multi-channel light driver, according to some embodiments of the present disclosure.

FIG. 2 illustrates a schematic diagram of a current control circuit 80 of the multi-channel light driver 30, according to some embodiments of the present disclosure.

Referring to FIG. 2, in some embodiments, the current control circuit 80 is electrically coupled to the secondary side 55*b* of the power supply circuit 50 and is electrically isolated from the primary side 55*a*. The current control circuit 80 includes a sense resistor ($R_{SENSE}$) 82 that is coupled between the output of the power supply circuit and the corresponding color channel 20/22/24 and is connected electrically in series with the corresponding color channel 20/22/24. The sense resistor 82 is configured to enable sensing of the channel current ($I_{CHANNEL}$) of the corresponding color channel 20/22/24.

In some embodiments, the current control circuit 80 also includes a regulator (also referred to as a buck regulator, a buck converter, or a step down converter) 84 configured to sense the output voltage of the power supply circuit 50 (e.g., at its $V_{IN}$ input), to sense the channel current via the sense resistor 82 (e.g., at its (SENSE input), to receive the reference signal (e.g., PWM signal) corresponding to the color channel 20/22/24 from the channel controller 100 (e.g., at its $V_{SET}$ input), and to regulate the channel current according to the sensed/received signals. The regulator 84 is configured to sense the current of the color channel 20/22/24 by measuring the voltage drop across the sense resistor 82 (via the $V_{IN}$ and the $I_{SENSE}$ inputs). In some embodiments, the channel current passing through the color channel 20/22/24 is routed back through the regulator 84 (via its LX input) to ground. The regulator 84 includes a switch (e.g., a metal oxide field effect transistor (MOSFET)) capable of switching the channel current on and off based on the sensed output voltage, the sensed channel current, and the reference signal. The current control circuit may also include an inductor 86 coupled between the color channel and the regulator 84 and positioned in a current path of the channel current which enables the regulator (e.g., the buck regulator) 84 to produce a regulated current. Thus, by controllably switching the channel current on and off, the regulator 84 may provide down-current regulation of the channel current.

One way to perform dimming using the regulator 84 is to lower the DC voltage of the reference signal, which in turn reduces the channel current and the light output intensity of the color channel. The regulator 84 may ensure a linear relationship between the level of the DC reference signal and the channel current for dimmer settings between about 5% to 100%. However, dimming below 5% (which corresponds to an inherent cut off voltage of the regulator 84) using a DC refence voltage at the $V_{SET}$ input may result in inconsistent channel current that does not linearly follow the applied DC reference voltage. The inconsistency of channel current may even be observed visually in the light output or among drivers that are compared side-by-side.

As an alternative, PWM dimming may be implemented as a solution to prevent the regulator 84 from operating in the non-linear region and achieve consistent dimming down to 1%. When applying a PWM signal (e.g., a square PWM signal) directly to the $V_{SET}$ input of the regulator 84, the regulator 84 is turned on and off and the average output current may be proportional to the duty cycle of the control PWM signal that is applied to the $V_{SET}$ input. However, direct PWM regulation leads to the channel current exhibiting large peak to peak ripples that may be anywhere between 50% to 100% ripple, which may be observed visually and is very undesirable.

Thus, according to some embodiments, to maintain accurate dimming down to 1% while reducing ripple in the channel current, a hybrid DC/PWM signal is applied to the regulator 84 to achieve the benefits of both DC and PWM dimming. In some embodiments, the hybrid DC/PWM signal is a pseudo-sawtooth waveform that is seen as an effective DC voltage when operating above the regulator's cutoff voltage (which may correspond to about 5% or higher dimming) and seen as a PWM signal after entering the cutoff region of operation of the regulator 84 (which may correspond to dimming below 5%).

According to some embodiments, to produce the pseudo-sawtooth signal, the channel controller 100 first generates the reference signal in the form of a PWM signal (e.g., a square PWM signal), which oscillates between two discrete values and has an adjustable/variable pulse width or duty cycle. The PWM signal is then filtered by a low pass filter 92 of the filter circuit 90 to produce the pseudo-sawtooth signal, which is a smoothly varying analog signal having a triangular or substantially triangular waveform. The low pass filter 92 may be a first order RC filter, as shown in FIG. 2; however, embodiments of the present application are not limited thereto, and the low pass filter 92 may be any suitable filter, such as a higher order filter or an RLC filter. Generating the pseudo-sawtooth waveform using a PWM signal and a filter obviates the need for a digital to analog converter (DAC) for each color channel, which would have increased the cost of the light driver.

The mode of operation of the regulator 84 is determined by the cutoff voltage associated with the $V_{SET}$ input, which causes the regulator 84 to shut off when the voltage at the $V_{SET}$ input drops below the cutoff voltage. While the voltage of the reference signal is above the cutoff voltage, the regulator 84 continuously adjust the channel current according to the effective DC value of the sawtooth signal at its $V_{SET}$ input. However, when the voltage of the sawtooth signal drops below the cutoff voltage, the regulator 84 is configured to turn off (e.g., disable the switch 88) thus shutting off the first channel current. The operation of the regulator 84 relative to the voltage at the $V_{SET}$ input is illustrated in FIGS. 3A-3F and FIGS. 4A-4F.

FIGS. 3A-3F illustrate the DC regulation mode in which each channel current is dictated by the effective DC voltage of the pseudo-sawtooth waveform from the channel controller 100, according to some embodiments of the present disclosure. FIGS. 4A-4F illustrate the PWM regulation mode in which the average channel current of each color channel corresponds to the duty cycle of the PWM reference signal, according to some embodiments of the present disclosure.

Figure 3A:
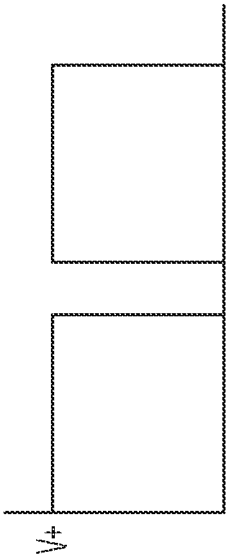
FIGS. 3A-3F illustrate a DC regulation mode of the current control circuit, in which each channel current is dictated by the effective DC voltage of a pseudo-sawtooth waveform from a channel controller, according to some embodiments of the present disclosure.
Figure 3B:
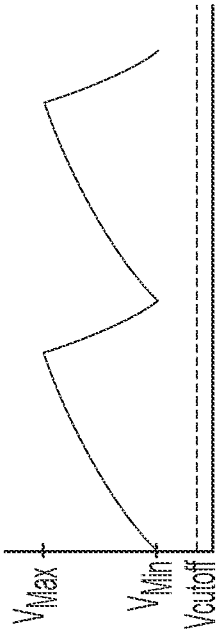
Figure 3C:
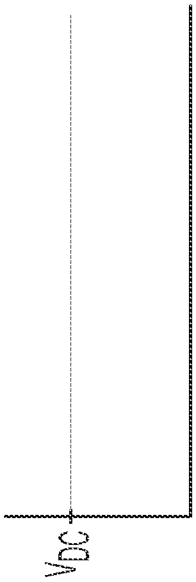
Figure 3D:
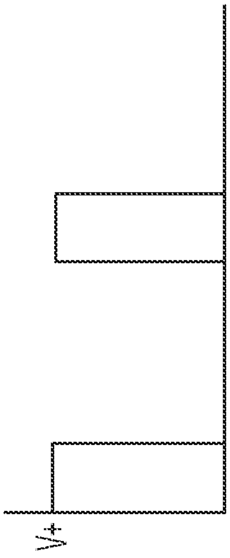
Figure 3E:
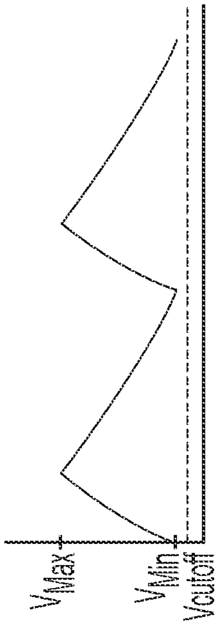
Figure 3F:
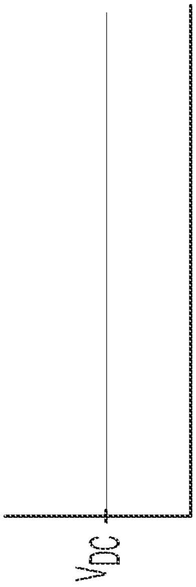

FIGS. 3A and 3D illustrates two different PWM reference signals generated by channel controller 100; FIGS. 3B and 3E illustrate the outputs of the low pass filter 92 (i.e., the pseudo-sawtooth signals) given the input PWM signals of FIGS. 3A and 3D, respectively; and FIGS. 3C and 3F illustrate the effective DC signals observed by the current control circuit 80 that correspond to the filter outputs of FIGS. 3B and 3E, respectively. As shown, when the voltages of the pseudo-sawtooth signals output by the low pass filter 92 are above the regulator's cutoff voltage, the regulator 84 operates in DC regulation mode, in which the current of the color channel 80 is determined (e.g., dictated) by the effective DC voltage of the pseudo-sawtooth waveform. The current ripple here may be proportional to the peak-to-peak voltage of the pseudo-sawtooth waveform. As shown in FIGS. 3A-3F, as the duty cycle of the PWM signal from the channel controller 100 decrease due to changes in desired dimming level, the pseudo-sawtooth waveform decreases in magnitude along with a change in the sawtooth duty cycle, thus reducing the effective DC signal that is applied to the $V_{SET}$ input of the regulator 84.

As the duty cycle of the PWM signal from the channel controller 100 continues to decrease, the length of time that the voltage level of the reference signal is lower than the cutoff voltage increases (see FIGS. 4A-4F). The resulting effective PWM waveform observed by the $V_{SET}$ input of the regulator 84 is that of a mixed DC and PWM signal that operates the regulator 84 in PWM regulation mode where the average channel current is proportional to the duty cycle of the PWM reference signal.

Figure 4A:
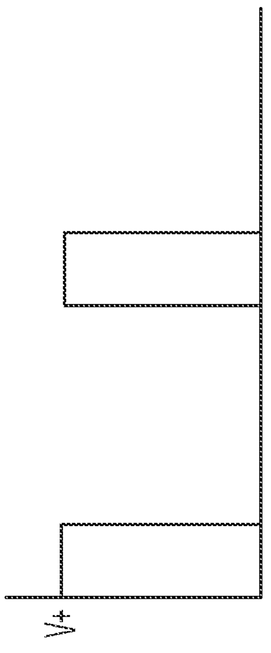
FIGS. 4A-4F illustrate a PWM regulation mode of the current control circuit, in which the average channel current of each color channel corresponds to the duty cycle of a PWM reference signal from the channel controller, according to some embodiments of the present disclosure.
Figure 4B:
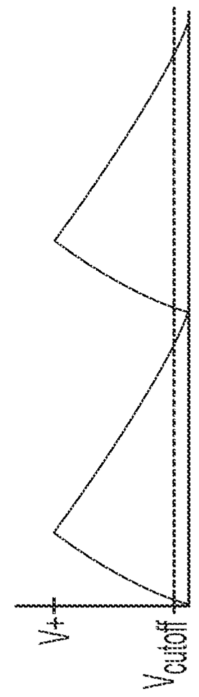
Figure 4C:
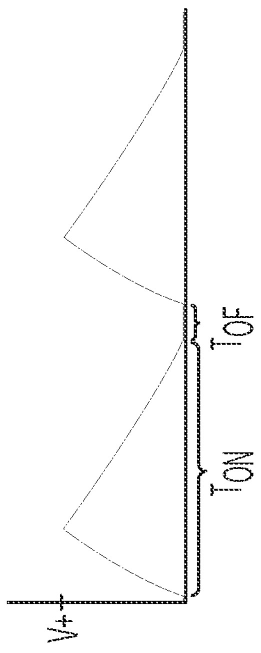
Figure 4D:
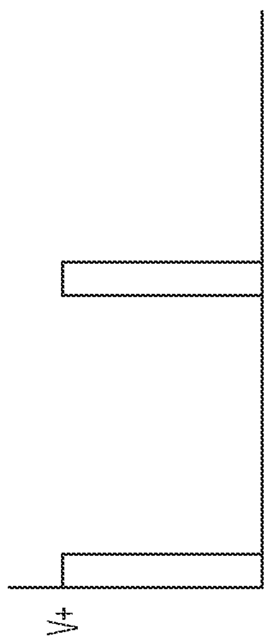
Figure 4E:
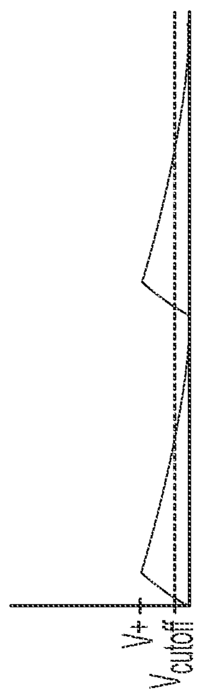

FIGS. 4A and 4D illustrates two different PWM reference signals generated by channel controller 100; FIGS. 4B and 4E illustrate the outputs of the low pass filter 92 (i.e., the pseudo-sawtooth signals) given the input PWM signals of FIGS. 4A and 4D, respectively; and FIGS. 4C and 4F illustrate the effective PWM signals observed by the current control circuit 80 that correspond to the filter outputs of FIGS. 4B and 4E, respectively.

Figure 4F:
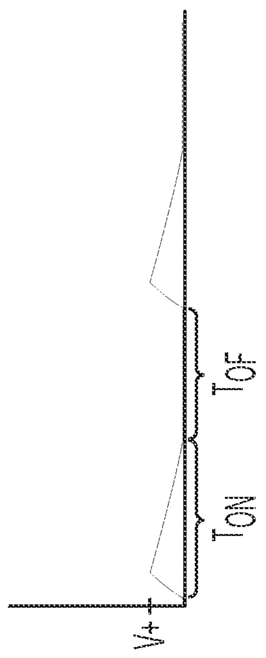

As shown in FIGS. 4B-4C and 4E-4F, when the voltage of the pseudo-sawtooth drops below the cutoff voltage, the regulator 84 deactivates the switch 88 thus cutting off the channel current. This translates to the effective PWM signal being at zero volts, as shown in FIGS. 4C and 4F.

As shown in FIGS. 3A-4F, the benefit to utilizing a pseudo-sawtooth signal to control the regulator 84 is that the regulator 84 is largely run in DC regulation mode when the $V_{SET}$ reference signal is above the cutoff voltage but enters PWM regulation mode when the mixed reference signal falls below the cutoff voltage.

By primarily operating the regulator 84 in DC regulation mode, the percent ripple in the color channel remains proportional to the percent ripple of the pseudo-sawtooth waveform applied to the regulator 84. In addition, consistent channel current is achieved when dimming below 5% because the average current of the color channel is proportional to the duty cycle of the effective PWM signal.

While FIG. 2 only shows a single current control circuit 80, it is merely for ease of illustration. As will be understood by a person of ordinary skill in the art, the other current control circuits shown in FIG. 1 have the same structure, and operate in the same manner, as the one shown in FIG. 2.

Referring back to FIGS. 1-2, in some embodiments, the channel controller 100 is configured to generate a first pulse width modulated (PWM) signal for controlling an output light intensity of the first color channel (e.g., green color channel) 20, a second PWM signal for controlling an output light intensity of the second color channel (e.g., blue color channel) 22, and a third PWM signal for controlling an output light intensity of the third color channel (e.g., the red color channel) 24.

The filter circuit 90 includes first to third low pass filters 92-1 to 92-3. The first low pass filter 92-1 is configured to generate a first pseudo-sawtooth signal based on the first PWM signal; the second low pass filter 92-2 is configured to generate a second pseudo-sawtooth signal based on the second PWM signal; and the first low pass filter 92-3 is configured to generate a third pseudo-sawtooth signal based on the third PWM signal.

According to some embodiments, a first current control circuit 80-1 coupled to the first color channel (e.g., the green color channel) 20 is configured to adjust a first channel current of the first color channel 20 based on the drive signal and the first pseudo-sawtooth signal. Similarly, a second current control circuit 80-2 coupled to the second color channel (e.g., the blue color channel) is configured to adjust a second channel current of the second color channel based on the drive signal and the second pseudo-sawtooth signal, and a third current control circuit 80-3 coupled to the third color channel (e.g., the red color channel) is configured to adjust a third channel current of the third color channel based on the drive signal and the third pseudo-sawtooth signal.

Accordingly, as described above, the light driver supplies a pseudo-sawtooth waveform, instead of a DC voltage signal or a single square PWM waveform, to each of the channel regulators to adjust the current of the corresponding LED channel. The pseudo-sawtooth waveform is generated from a PWM square waveform that is issued by the channel controller and filtered using analog components. The pseudo-sawtooth waveform allows the regulator to maintain DC regulation above a certain dimming threshold (e.g., 5% dimming) and to switch to PWM regulation when operating under the dimming threshold. Thus, each LED channel primarily operates in DC regulation mode and has lower ripple current until the channel enters PWM regulation mode. When in PWM dimming, the current of the LED channel can dim linearly down to 1% dimming.

It will be understood that, although the terms “first”, “second”, “third”, etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include”, “including”, “comprises”, and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of”, when preceding a list of elements, modify the entire list of elements and do not modify the individual elements of the list. Further, the use of “may” when describing embodiments of the inventive concept refers to “one or more embodiments of the inventive concept”. Also, the term “exemplary” is intended to refer to an example or illustration.

It will be understood that when an element or layer is referred to as being “on”, “connected to”, “coupled to”, or “adjacent” another element or layer, it can be directly on, connected to, coupled to, or adjacent the other element or layer, or one or more intervening elements or layers may be present. When an element or layer is referred to as being “directly on,” “directly connected to”, “directly coupled to”, or “immediately adjacent” another element or layer, there are no intervening elements or layers present.

As used herein, the terms “substantially”, “about”, and similar terms are used as terms of approximation and not as terms of degree, and are intended to account for the inherent variations in measured or calculated values that would be recognized by those of ordinary skill in the art.

As used herein, the terms “use”, “using”, and “used” may be considered synonymous with the terms “utilize”, “utilizing”, and “utilized”, respectively.

The lighting system and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A multi-channel power supply system comprising:

a power supply circuit configured to generate a drive signal for powering a plurality of color channels based on an input power signal;

a channel controller configured to generate a first pulse width modulated (PWM) signal for controlling an output light intensity of a first color channel of the plurality of color channels;

a filter circuit configured to generate a first pseudo-sawtooth signal based on the first PWM signal; and a first current control circuit coupled to the first color channel of the plurality of color channels and configured to adjust a first channel current of the first color channel based on the drive signal and the first pseudo-sawtooth signal, the first current control circuit being configured to continuously adjust the first channel current according to an effective duty cycle of the first pseudo-sawtooth signal in response to the first pseudo-sawtooth signal falling below a cutoff voltage.

2. The multi-channel power supply system of claim 1, wherein the first color channel comprises one or more light emitting diodes (LEDs) having a red color, a blue color, or a green color, the one or more LEDs being configured to output a light intensity corresponding to the first channel current.

3. The multi-channel power supply system of claim 1, wherein the first current control circuit comprises:

a regulator coupled to the first color channel, and configured to receive the drive signal, the first pseudo-sawtooth signal, and the first channel current, and to regulate the first channel current based on the first pseudo-sawtooth signal.

4. The multi-channel power supply system of claim 3, wherein the effective duty cycle of the first pseudo-sawtooth signal corresponds to a dimming level set by a dimming controller.

5. The multi-channel power supply system of claim 3, wherein, in response to the first pseudo-sawtooth signal being above the cutoff voltage, the regulator is further configured to continuously adjust the first channel current according to an effective DC value of the first pseudo-sawtooth signal, and wherein the effective DC value of the first pseudo-sawtooth signal corresponds to a dimming level set by a dimming controller.

6. The multi-channel power supply system of claim 3, wherein the first current control circuit further comprises:

a sense resistor electrically coupled in series with the first color channel and in a current path of the first channel current, wherein the regulator is configured to sense the first channel current by measuring a voltage drop across the sense resistor.

7. The multi-channel power supply system of claim 3, wherein the first current control circuit further comprises:

an inductor coupled between the first color channel and the regulator and positioned in a current path of the first channel current to enable the regulator to regulate the first channel current.

8. The multi-channel power supply system of claim 1, wherein the filter circuit comprises:

a first low pass filter coupled between the channel controller and the first current control circuit and configured to low pass filter the first PWM signal to generate the first pseudo-sawtooth signal that is a smoothly varying analog signal.

9. The multi-channel power supply system of claim 1, wherein the channel controller is configured to generate the first PWM signal based on a dimmer setting from a dimming controller.

10. The multi-channel power supply system of claim 1, further comprising:

an output rectifier coupled to a secondary winding of the power supply circuit and configured to prevent a reverse current at the first color channel; and a capacitor coupled to the output rectifier and configured to filter the drive signal.

11. The multi-channel power supply system of claim 1, wherein the channel controller, the filter circuit, and the first current control circuit are coupled to a secondary side of the power supply circuit.

12. The multi-channel power supply system of claim 1, wherein the power supply circuit comprises:

a voltage converter; and a transformer having a primary winding coupled to the voltage converter and a secondary winding electrically isolated from the primary winding and coupled to the first current control circuit.

13. The multi-channel power supply system of claim 1, further comprising:

an input rectifier circuit configured to rectify the input power signal to generate a rectified signal having a single polarity, wherein the power supply circuit is configured to generate the drive signal based on the rectified signal.

14. The multi-channel power supply system of claim 13, wherein the input rectifier circuit comprises a bridge rectifier, and the input power signal is an alternating-current (AC) signal.

15. A multi-channel power supply system comprising:

a power supply circuit configured to generate a drive signal for powering a plurality of color channels based on an input power signal;

a channel controller configured to generate a first pulse width modulated (PWM) signal for controlling an output light intensity of a first color channel of the plurality of color channels;

a filter circuit configured to generate a first pseudo-sawtooth signal based on the first PWM signal; and a first current control circuit coupled to the first color channel of the plurality of color channels and configured to adjust a first channel current of the first color channel based on the drive signal and the first pseudo-sawtooth signal, wherein the channel controller is further configured to generate a second PWM signal for controlling an output light intensity of a second color channel of the plurality of color channels, and to generate a third PWM signal for controlling an output light intensity of a third color channel of the plurality of color channels.

16. The multi-channel power supply system of claim 15, wherein the filter circuit further comprises:

a second low pass filter configured to generate a second pseudo-sawtooth signal based on the second PWM signal; and a third low pass filter configured to generate a third pseudo-sawtooth signal based on the third PWM signal.

17. A multi-channel power supply system comprising:

a power supply circuit configured to generate a drive signal for powering a plurality of color channels based on an input power signal;

a channel controller configured to generate a first pulse width modulated (PWM) signal for controlling an output light intensity of a first color channel of the plurality of color channels;

a filter circuit configured to generate a first pseudo-sawtooth signal based on the first PWM signal;

a first current control circuit coupled to the first color channel of the plurality of color channels and configured to adjust a first channel current of the first color channel based on the drive signal and the first pseudo-sawtooth signal;

a second current control circuit coupled to a second color channel of the plurality of color channels and configured to adjust a second channel current of the second color channel based on the drive signal and a second pseudo-sawtooth signal; and a third current control circuit coupled to a third color channel of the plurality of color channels and configured to adjust a third channel current of the third color channel based on the drive signal and a third pseudo-sawtooth signal.

18. The multi-channel power supply system of claim 17, wherein the first color channel comprises one or more green light emitting diodes (LEDs), wherein the second color channel comprises one or more blue LEDs, and wherein the third color channel comprises one or more red LEDs.

19. A multi-channel power supply system comprising:

a power supply circuit configured to generate a drive signal for powering a plurality of color channels based on an input power signal, the plurality of color channels comprising a red color channel, a green color channel, and a blue color channel;

a channel controller configured to generate a first pulse width modulated (PWM) signal for controlling an output light intensity of the green color channel, a second PWM signal for controlling an output light intensity of the blue color channel, and a third PWM signal for controlling an output light intensity of the red color channel;

a filter circuit configured to generate a first pseudo-sawtooth signal based on the first PWM signal, a second pseudo-sawtooth signal based on the second PWM signal, and a third pseudo-sawtooth signal based on the third PWM signal;

a first current control circuit coupled to the green color channel and configured to adjust a first channel current of the green color channel based on the drive signal and the first pseudo-sawtooth signal;

a second current control circuit coupled to the blue color channel and configured to adjust a second channel current of the blue color channel based on the drive signal and the second pseudo-sawtooth signal; and a third current control circuit coupled to the red color channel and configured to adjust a third channel current of the red color channel based on the drive signal and the third pseudo-sawtooth signal.

* * * * *